July 24, 1956  J. B. HARRISON ET AL  2,756,269

BATTERY GRID

Filed Oct. 22, 1952

INVENTORS
JOHN B. HARRISON
GARTH A. ROWLS
BY

THEIR ATTORNEYS

United States Patent Office 2,756,269
Patented July 24, 1956

2,756,269

BATTERY GRID

John B. Harrison and Garth A. Rowls, Muncie, Ind., assignors to General Motors Corporation, Detroit, Mich., a corporation of Delaware Application October 22, 1952, Serial No. 316,192

2 Claims. (Cl. 136—39)

This invention relates to storage batteries and is more particularly concerned with the battery plate structure for use in a Faure type battery.

Batteries used in certain specific applications such as telephone batteries are often subjected to considerable and repeated overcharges. It has been found that batteries of this type exhibit a relatively large growth in the positive plates when subjected to this condition. To provide for the growth, the practice has been to hang the plates on terminal post lugs. A fastening of this type is insufficient when the batteries are roughly handled as during shipping.

Our invention is directed to the formation of a plate for a battery that will withstand the rough handling of shipment, be suitable for use in a battery subjected to continued overcharging, and be economical to manufacture.

One of the objects of our invention is to reduce the cost of manufacture of the battery by reducing the rejections of battery plates caused by improper adherence of the plate paste to the grid structure without materially increasing the weight of metal used in the plate.

Another of the objects of the present invention is to provide a plate for a heavy duty type storage battery capable of withstanding the rigors of shipping and be useful in the battery subjected to repeated overcharging.

Another object of our invention is to provide a grid for a battery which has relatively heavy members forming substantially square sections which are crossed by thinner wire members adapted to retain the paste during manufacture and when the plates are placed in the battery. These thin wires are adapted to be destroyed or deformed by the growth of the positive plates during periods of overcharging.

Another object of our invention is to provide a grid for a battery having thin substantially parallel wires thereon which because of their hemispherical shape and alternately faced staggered position on each side of the center line of the grid will retain the paste during the pasting and curing process, but will be subject to destruction or deformation upon growth of the positive plate due to overcharging.

Further objects and advantages of the present invention will be apparent from the following description, reference being had to the accompanying drawings wherein a preferred embodiment of the present invention will be clearly shown.

Figure 1:
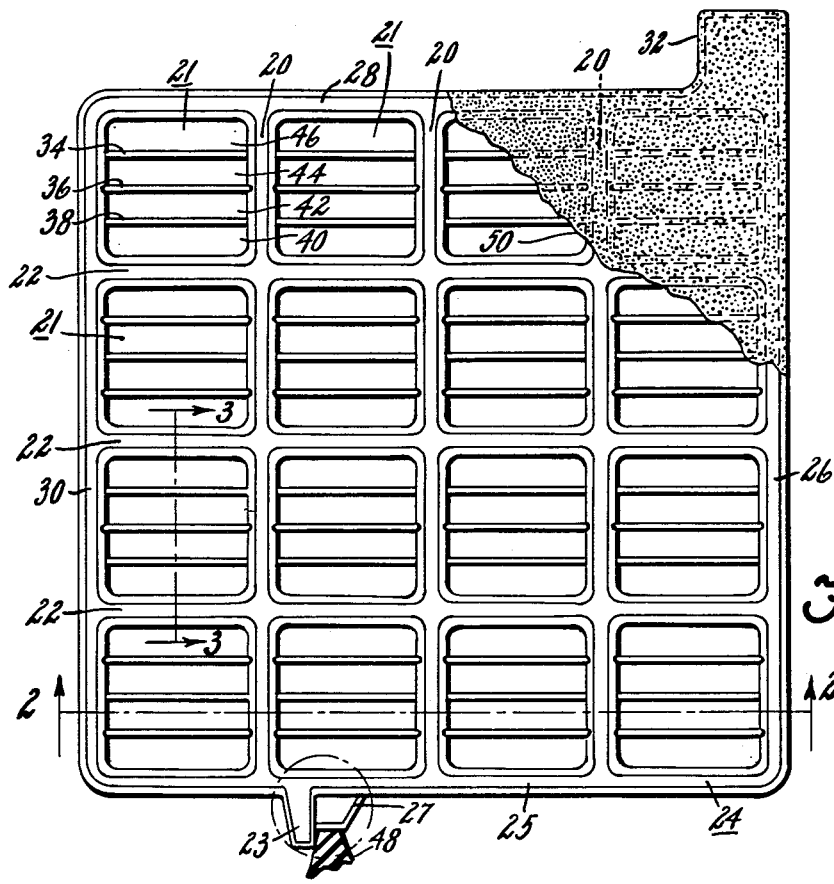
Fig. 1 is a plan view of a storage battery plate embodying the present invention, showing thin wires attached to the grid members and a destructible or deformable support attached to the frame.
Figure 2:
Fig. 2 is a sectional view on the line 2—2 of Fig. 1 showing destructible or deformable wires along the plane of the center line of the grid.

It has been the practice heretofore to apply paste to a battery plate grid and then cure and dry the paste on the grid under suitable conditions. After the paste has been thoroughly dried, the pasted plates are stored in stacks until they are assembled into a battery such as is clearly disclosed and described in our concurrently filed application, Ser. No. 316,191.

Our invention is directed to supports for the plates and paste effective during shipment that will not interfere with the growth of the positive plate when the battery is subjected to overcharges. This is accomplished by lugs 23 which are formed on a frame element of the grid of the positive plate 24. These lugs are of a suitable length and location as to come in contact with a vertical surface of a support rib 48 located on the bottom of the battery (not shown). This arrangement will prevent the transverse movement or excessive vibration of the plate.

A support means such as an angularly formed thin wire member 27 having one end attached to the lug 23 and the other to the frame element of the grid of the positive plate 24 will support the plate on the support wire which rests on the horizontal surface of a support rib located on the bottom of the battery. The support wire, will be susceptible to destruction or distortion by the chemical and/or electrolytic action thereby permitting substantially free growth of the plate after the battery is in use.

Figure 3:
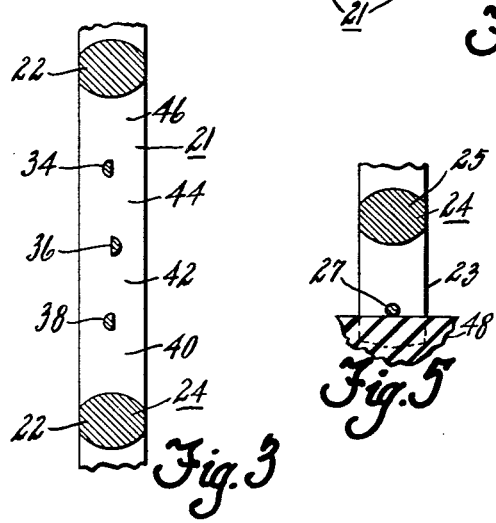
Fig. 3 is an enlarged view of a sectional view on the line 3—3 of Fig. 1 showing destructible or deformable thin wires of hemispherical shape and alternate staggering of said wires on each side of the center line of the plate.
Figure 5:
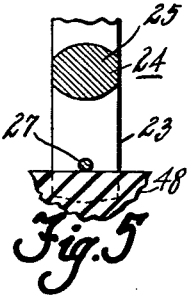
Fig. 5 is a sectional area of a support wire taken on line 5—5 of Fig. 4.
Figure 4:
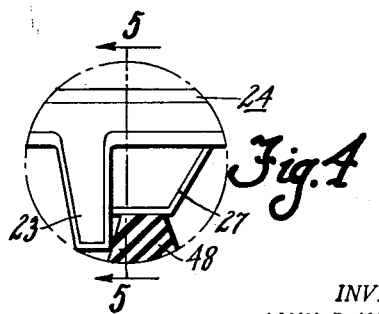
Fig. 4 is an enlarged view of a support wire structure of the plate.

In order to further permit normal growth of the plate during use and overcharging and yet provide support for the paste during manufacture and shipping of the battery, we have modified the usual grid design. This is accomplished by using a strong, relatively heavy framework which includes a network of wires of considerably smaller cross-section. Referring to Fig. 1, a battery grid 24, which may be formed by casting, punching or any other suitable method from a suitable metal such as lead or lead alloy, includes a plurality of heavy intersecting wire elements shown at 20 and 22 which form approximately square section areas 21 within the substantially square area formed by the four wire framelike members 25, 26, 28 and 30 which have approximately the same diameter as the intersecting wires 20 and 22. An attaching lug 32 formed on wire-like frame members is used to suspend the plate from the terminal of the battery. A plurality of substantially parallel destructible or deformable wire-like elements as shown by 34, 36 and 38 divide each area 21 into smaller sections 40, 42, 44 and 46. The smaller areas as 40 formed by the wire-like elements 38 effectively hold the paste 50 in place during manufacture and shipping. The thin destructible or deformable wire-like members, as 38, may have a semi-cylindrical shape in cross-section as shown in Fig. 3 and are preferably located in a staggered alternately faced relation with the flat surfaces of the wire on the center line of the plane of the grid. These thin destructible or deformable wires, because of their relative size to the larger wire-like elements of the grid are adapted to be deformed during distortion of the positive plate when the battery is overcharged thereby preventing cracking of the paste or excessive distortion of the plate.

From the foregoing it will be seen that we have provided a rigid, strong plate structure that will resist distortion due to overcharge. Included in this structure is a plurality of relatively thin wire-like elements that aid in supporting the paste during manufacture, assembly and shipping which because of their relative thinness are deformable and/or destructible when the battery is placed in use and subjected to overcharge. In other words the thin wire-like elements perform a transient function when needed and are sufficiently thin to permit distortion when the plate grows due to overcharge.

While the embodiments of the present invention as herein disclosed, constitute a preferred form, it is to be understood that other forms might be adopted.

What is claimed is as follows:

1. A battery grid comprising; a frame, a plurality of parallel vertical elements arranged symmetrically about the frame's center plane and having substantially the same thickness as the frame, a first set of horizontal, thin wire-like elements having a semi-cylindrical cross section with the flat surfaces thereof oppositely faced on opposite sides of said center plane, and a second set of horizontal elements comprising at least one element having substantially the thickness of said frame interposed between said first horizontal elements and being arranged symmetrically about the center plane of said frame.

2. A battery grid comprising; a frame having a center plane, a plurality of parallel vertical elements arranged symmetrically about the center plane of the frame and having substantially the same thickness as the frame, a plurality of thin horizontal wire-like elements of substantially less thickness than said frame and extending between said vertical elements and between the vertical elements and the frame and having a semi-cylindrical cross sectional shape including at least one substantially flat surface, adjacent horizontal elements having the flat surfaces thereof vertically disposed and oppositely faced on opposite sides of said center plane, and at least one horizontal element having substantially the thickness of said frame interposed between two of said first mentioned horizontal elements and being arranged symmetrically about the center plane of said frame.

References Cited in the file of this patent

UNITED STATES PATENTS

| | | |
|---|---|---|
| 1,970,189 | Reinhardt | Aug. 14, 1934 |
| 2,261,053 | DeMartis et al. | Oct. 28, 1941 |
| 2,625,574 | Fuller | Jan. 13, 1953 |

OTHER REFERENCES

Perkins Battery Co. Publication, "Patent Application 500,769" by Fred Perkins, pages 1–3, Sept. 10, 1943.